(No Model.)
R. BAIRD.
VALVE ATTACHMENT FOR GRAVITY LUBRICATORS.
No. 274,894. Patented Apr. 3, 1883.
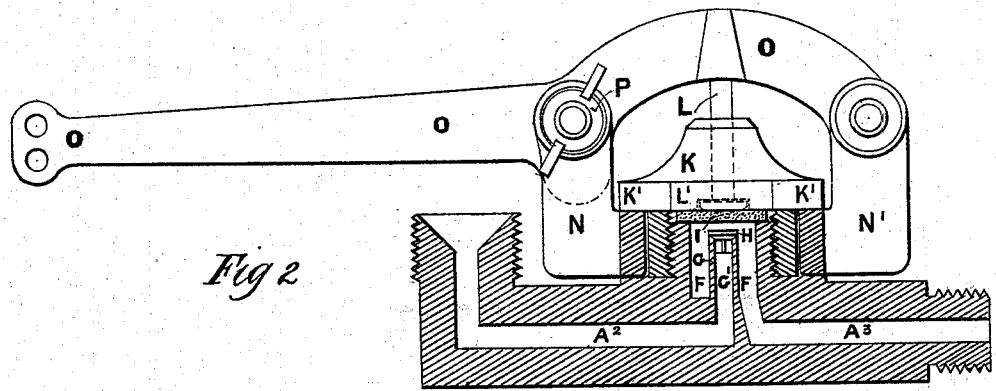
Fig 2
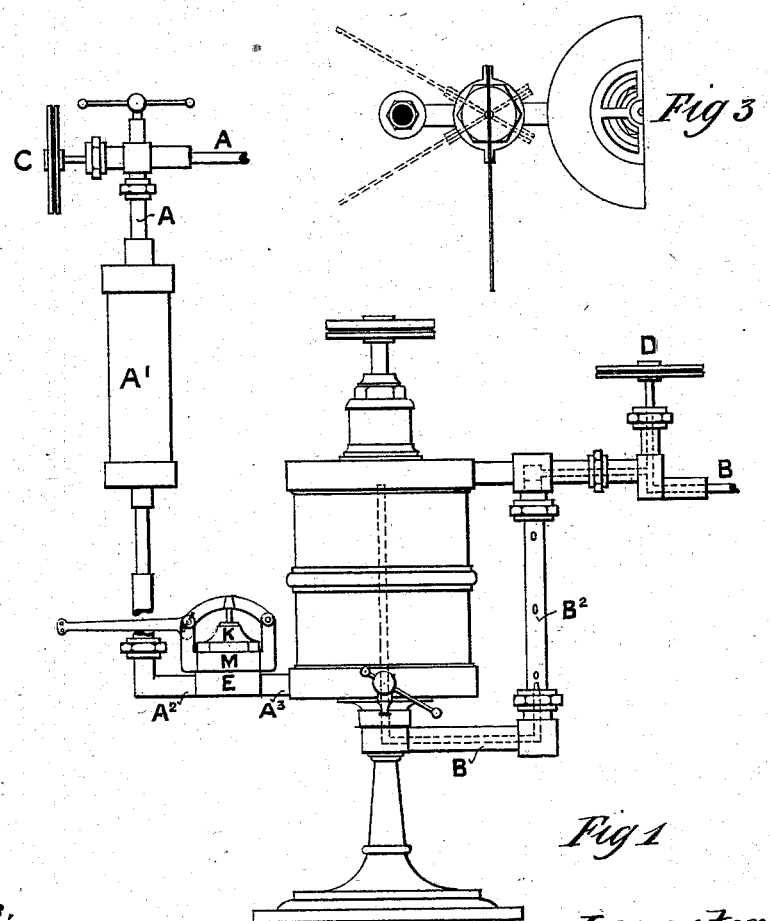
Fig 3
Fig 1
Witnesses.
George Tilghman
Robert Everett
Inventors.
Robert Baird,
by Wm H Babcock
Attorney

UNITED STATES PATENT OFFICE.

ROBERT BAIRD, OF GLASGOW, SCOTLAND, ASSIGNOR TO BOULT BROTHERS & CO., OF SAME PLACE.

VALVE ATTACHMENT FOR GRAVITY-LUBRICATORS.

SPECIFICATION forming part of Letters Patent No. 274,894, dated April 3, 1883.

Application filed January 29, 1883. (No model.) Patented in England September 19, 1882, No. 4,455.

*To all whom it may concern:*

Be it known that I, ROBERT BAIRD, a subject of the Queen of England, residing at Glasgow, Scotland, have invented a new and useful Valve Attachment for Gravity-Lubricators, of which the following is a specification.

In the accompanying drawings, Figure 1 is an elevation of an ordinary Baird's "sight-feed" gravity-lubricator, showing the valve attachment in position. Fig. 2 is an elevation, partly in section, of the valve attachment; and Fig. 3 is a plan to show how the attachment clears the pipe.

Before describing the attachment I will briefly describe the action of the lubricator, which, however, forms no part of my present invention, so that the object and action of the attachment may be better understood.

The pipes A and B, Fig. 1, both connect with the main steam-supply pipe for the engine which is to be lubricated, so that an equal pressure exists all through the lubricator. Water, however, is formed in the pipe A and condenser A', which falls by its greater specific gravity, and, through the pipes $A^2$ and $A^3$, enters the body of the lubricator near the bottom, displacing some of the lubricant which overflows down the central tube (shown in dotted lines in Fig. 1) and passes by the pipe B' to the glass tube $B^2$, which is full of water, the oil rising through the water in drops or a constant stream, according as the flow is regulated by the valves C and D. Said valves C and D are usually so adjusted as to pass the proper amount of oil for the exact requirements of the engine to which it may be connected, and it is not desirable to alter these whenever the engine is stopped, and consequently the oil goes on flowing to waste after the engine has ceased to work.

The object and advantages of the valve attachment will now readily be understood when it has been described.

Referring to Fig. 2, it will be seen that the boss or projection E upon pipe $A^2$ has a recess or well, F, having a vertically-projecting tube or portion, G, the top of which forms a seating for the back-pressure valve H. The hollow interior G' of tube G communicates by tube $A^2$ with the condenser A'. Tube $A^3$ connects with well F outside tube G', so that valve H separates the two. An elastic diaphragm, I, closes the top of the well, and is firmly fixed by the nut or cover K, which screws upon the outside of E, as clearly shown in Fig. 2. A spindle, L, having a head, L', passes through and is free to move longitudinally in a hole through the nut K. The upper portion of nut K projects all round at K', and serves to retain in position a collar, M, which is free to revolve around the lower portion of K. Lugs or projections N and N' upon collar M serve to carry the lever O, N' serving as a hinge and N having a thumb-screw, P, for fixing the lever in any particular position when required. The free end O' of lever O is connected in any convenient manner with any suitable lever or other portion of the machinery which is moved at starting and stopping the engine. The action of the valve is as follows: The water condensed in the tube A and condenser A' passes by tube $A^2$ up the interior G' of tube G, lifts valve H, (lever O being raised clear,) and passes into the well F, and so by tube $A^3$ to the cap, where its subsequent action has been already explained. Now, the lever O, being connected with some portion of the engine which is moved at starting and stopping, when the engine is stopped the free end of O is depressed, forcing in spindle L, which stretches the elastic diaphragm I till it rests upon valve H and prevents it from rising, and therefore cuts off the supply of water to cup, and thus stops any oil from passing until lever O is released—*i. e.*, until the engine is started again. The collar M is arranged to turn round, so as to allow the end of lever O to be turned to the most convenient point for attachment to the machinery. When required the lever O may be so set by means of the thumb-screw P as to regulate the supply of water by not allowing the valve to open beyond a certain limit.

Great saving is effected by the use of this valve, and especially in the case of colliery winding-engines, river steamers, and the like, which are constantly starting and stopping. The back-pressure valve also tends to regulate the flow of oil by neutralizing the shocks and uneven flow of steam, should the cup be fixed too near the cylinder of the engine.

I am aware that it has been proposed to place a valve in the portion of the cup or attachments which is filled with the lubricant; but a valve so placed gets clogged up. The valve above described is so situated in the water column that the lubricant, in ordinary working, never touches it.

Having now described my invention, I claim—

1. In combination with the water-supply pipe of a gravity-lubricator, a valve arranged to shut off the supply of water through said pipe, and a lever, O, which operates said valve, and is connected to some portion of the machinery which is used in starting or stopping the engine, substantially as and for the purpose set forth.

2. The combination of the lever O, lugs N N', collar M, and nut K, whereby said lever may be adjusted to the situation in which it is placed, substantially as described and illustrated.

3. The combination, in a gravity-lubricator, of the lever O, spindle L, elastic diaphragm I, and valve H, as a means of cutting off the supply of water, and thereby regulating the action of the lubricator, substantially as specified.

4. The combination, in a gravity-lubricator, of the lever O, spindle L, elastic diaphragm I, and valve H, as a means of cutting off the supply of water, and thereby stopping the action of the lubricator, substantially as specified.

5. The nut K, which serves the several purposes of fixing the elastic diaphrapm I, supporting the spindle L, and supporting and securing the collar M, substantially as described and shown.

6. The employment, in a gravity-lubricator, of the well F, tube G, and valve H, in combination with tubes $A^2$ and $A^3$ in the water column or section, substantially as and for the purpose specified and illustrated.

In testimony whereof I, the said ROBERT BAIRD, have hereunto set my hand in the presence of two subscribing witnesses.

ROBERT BAIRD.

Witnesses:
JOHN BROWNLIE,
*Solicitor, Glasgow.*
DONALD A. MCNAB,
*Law Clerk, Glasgow.*